United States Patent [19]

Bauer et al.

[11] Patent Number: 5,374,302
[45] Date of Patent: Dec. 20, 1994

[54] WATER-INSOLUBLE SULPHUR DYES, THEIR PREPARATION AND USE

[75] Inventors: Wolfgang Bauer, Maintal; Willi Steckelberg, Hofheim; Josef Ritter, Bad Soden; Wilhelm Mauelshagen, Bad Camberg, all of Germany

[73] Assignee: Cassella AG, Frankfurt, Germany

[21] Appl. No.: 132,208

[22] Filed: Oct. 6, 1993

[30] Foreign Application Priority Data

Oct. 19, 1992 [DE] Germany .............................. 4235147

[51] Int. Cl.$^5$ ................................................ C08K 5/47
[52] U.S. Cl. ................................. 106/22 H; 106/20 R; 106/20 D; 106/493; 106/498; 106/506
[58] Field of Search ................ 106/20 R, 20 D, 22 H, 106/493, 498, 506

[56] References Cited

U.S. PATENT DOCUMENTS

| | | | |
|---|---|---|---|
| 4,941,923 | 7/1990 | Sotogoshi | 106/498 |
| 5,300,148 | 4/1994 | Domingo et al. | 106/498 |
| 5,304,244 | 4/1994 | Goldmann et al. | 106/498 |

FOREIGN PATENT DOCUMENTS 0325172  7/1989  European Pat. Off. .

*Primary Examiner*—Mark L. Bell
*Assistant Examiner*—Scott L. Hertzog
*Attorney, Agent, or Firm*—Connolly & Hutz

[57] ABSTRACT

The water-insoluble dyes of the formula I $$F-(CH-COO^{\ominus}M^{\oplus})_n \quad\text{(I)}$$
with $R^1$ on the CH in which, for example,
  F is the dye chromophore of C.I. Leuco Sulphur Black 1,
  R is hydrogen, alkyl,
  $M^{\oplus}$ is a quaternary ammonium cation or phosphonium cation in which the sum of carbon atoms in the hydrophobic radicals present is at least 6, and
  n is such a large number that the dye I contains 5 to 20% by weight of —COO$^{\ominus}$ groups, are suitable in particular for producing recording fluids.

14 Claims, No Drawings

WATER-INSOLUBLE SULPHUR DYES, THEIR PREPARATION AND USE

The present invention relates to black water-insoluble sulphur dyes of the formula I

in which F is the dye chromophore of C.I. Sulphur or Leuco Sulphur Black 1, C.I. No. 53185; C.I. Sulphur or Leuco Sulphur Black 2, C.I. No. 53195; C.I. Sulphur or Leuco Sulphur Black 5, C.I. No. 53205; C.I. Sulphur Black 6, C.I. No. 53295; C.I. Sulphur Black 7, C.I. No 53300; C.I. Sulphur or Leuco Sulphur Black 10, C.I. No. 53190; C.I. Sulphur Black 11, C.I. No. 53290, or C.I. Sulphur or Leuco Sulphur Black 12, C.I. No. 53200, $R^1$ is hydrogen, alkyl, $M^\oplus$ is a cation of the formula II

X is nitrogen or phosphorus, $R^2$, $R^3$, $R^4$, $R^5$, independently of one another, are hydrogen, an aliphatic radical which is substituted or unsubstituted and/or interrupted by hereto groupings and/or arylene, a cycloaliphatic radical which is substituted or unsubstituted and/or interrupted by hetero groupings, a substituted or unsubstituted aryl radical or —$(CH_2CH_2O)_mR^6$, or 2 or 3 of the radicals $R^2$, $R^3$, $R^4$, $R^5$ together with the quaternary atom X to which they are attached form a heterocyclic ring which may also contain other hetero groupings and/or be substituted, and $R^6$ is hydrogen, alkyl, m is a number from 1 to 5, n is such a large number that the dye I contains 5 to 20% by weight of —$COO^\ominus$ groups, the sum of carbon atoms of the hydrophobic radicals present in $R^2$, $R^3$, $R^4$ and $R^5$ in cation II being at least 6.

The invention also relates to a process for preparing the sulphur dyes according to the invention of the formula I and to their use and to a recording fluid.

Radicals $R^2$ to $R^5$ can be identical or different. Since the sum of carbon atoms in the hydrophobic, i.e. non-water-solubilizing radicals, present in the cation of the formula II must be at least 6, it follows that radicals $R^2$ to $R^5$ cannot all be hydrogen and/or —$(C_2CH_2O)_mR^6$. The sum of carbon atoms in the hydrophobic radicals present in cation II is preferably at least 7, particularly preferably at least 8.

The alkyl radicals as $R^1$ and $R^6$ can be straight-chain or branched. Preferred alkyl radicals for $R^1$ are methyl and ethyl. Preferred alkyl radicals for $R^6$ are those having 1 to 4 C atoms, in particular methyl and ethyl.

The aliphatic radicals as $R^2$ to $R^5$ can be straight-chain or branched, saturated or unsaturated. The aliphatic radicals $R^2$ to $R^5$ are preferably those containing 1 to 30 C atoms. Of these, straight-chain and branched alkyl or alkenyl radicals are preferred. The alkyl radicals have particularly preferably 1 to 22 C atoms and the alkenyl radicals particularly preferably 2 to 22 C atoms. Examples of suitable aliphatic radicals are: methyl, ethyl, n-propyl, i-propyl, n-butyl, i-butyl, sec.-butyl, tert.-butyl, n-pentyl, i-pentyl, n-hexyl, i-hexyl, n-octyl, i-octyl, nonyl, decyl, dodecyl, tetradecyl, hexadecyl, octadecyl, oleyl, coconut fatty alkyl, 9-octadecenyl, tallow fatty alkyl, soya oil alkyl. Particularly preferred alkyl radicals for $R^2$ to $R^5$ are: methyl, ethyl, propyl, butyl, pentyl, hexyl, octyl, nonyl, decyl, dodecyl, tetradecyl and hexadecyl, it being possible for each of these radicals also to be present in branched form from $C_3$ onwards.

The aliphatic radicals can also be mono- or polysubstituted and/or interrupted by hetero groupings and/or arylene. Substituents which may be mentioned are in particular: hydroxyl, alkoxy, in particular ($C_1$-$C_4$)-alkoxy, which can be straight-chain or branched, primary, secondary and tertiary amino groups, aryl, in particular phenyl, which can be mono-, di- or trisubstituted by, in particular, phenyl, ($C_1$-$C_4$)alkyl, (C-$C_4$)alkoxy, halogen or trifluoromethyl. The aliphatic radical can also be interrupted once or more than once by hetero groupings. In this context, hetero groupings are understood to mean in particular: —O—, —S—, —NH—, —N(($C_1$-$C_4$)alkyl)—, furthermore ester groupings (—COO— and —OOC—) and amide groupings (—CO—NH—, —NH—CO—, —CO—N($C_1$-$C_4$)alkyl, —N(($C_1$-$C_4$)alkyl)—CO—), but also bivalent heterocyclic radicals which may be derived, for example, from pyrrole, pyrrolidine, pyridine, piperidine, imidazole. The aliphatic radical can also be interrupted by arylene, preferably phenylene, in particular 1,4-phenylene.

Preferred substituted aliphatic radicals are aliphatic radicals having 1 to 6 C atoms which are substituted by a substituted or unsubstituted ($C_6$-$C_{12}$)aryl radical, in particular ($C_6$-$C_{12}$)-aryl-($C_1$-$C_6$)alkyl radicals. The ($C_6$-$C_{12}$)aryl radicals are in particular phenyl, α- and β-naphthyl. Examples of such substituted aliphatic radicals of this type are benzyl, phenethyl, phenylpropyl, phenylbutyl, phenylhexyl, α- and β-naphthylmethyl, -ethyl, -propyl, -pentyl, -hexyl, 4-biphenylmethyl. The preferred ($C_6$-$C_{12}$)aryl-($C_1$-$C_6$)alkyl radical is benzyl.

The cycloaliphatic radicals can be mononuclear or polynuclear cycloalkyl or cycloalkenyl radicals. They usually contain at least 5 C atoms, preferably 5 to 12 C atoms. Particular preference is given to cyclopentyl and cyclohexyl.

The cycloaliphatic radicals can also be substituted and/or interrupted by hereto groupings in the same manner as the aliphatic radicals. Suitable substituents are in particular the substituents mentioned under the aliphatic radicals and preferably straight-chain or branched ($C_1$-$C_{22}$)alkyl and/or ($C_1$-$C_{22}$)alkoxy and suitable hereto groupings are the hereto groupings already mentioned under the aliphatic radicals, in particular —O—, —S—, —NH—, —N($C_1$-$C_4$)alkyl, ester and amide groupings.

The aryl radical as $R^2$ to $R^5$ is an α- or β-naphthyl radical, preferably a phenyl radical.

The aryl radical can also be mono- or polysubstituted, in particular by hydroxyl, halogen, trifluoromethyl, primary, secondary and tertiary amino groups, but preferably by an aliphatic radical which is substituted or unsubstituted and/or interrupted by hereto groupings and/or arylene and/or a cycloaliphatic radical which is substituted or unsubstituted and/or interrupted by hereto groupings. That which has already been stated for the aliphatic and cycloaliphatic radicals as $R^2$ to $R^5$ also applies to these substituted or unsubstituted and/or interrupted aliphatic and cycloaliphatic radicals.

If 2 or 3 of the radicals $R^2$ to $R^5$ together with the quaternary atom X to which they are attached form a heterocyclic ring, the atom X is preferably nitrogen. The heterocyclic ring can be saturated, unsaturated or aromatic and can contain, apart from the atom X, also other hetero atoms, such as, for example, —O—, —N= or hereto atom groupings, such as —NH—, —N(alkyl)—, in particular —N(($C_1$-$C_4$)alkyl)—, and possess a fused-on ring. The heterocyclic ring is in particular a 5- or 6-membered ring, with or without a fused-on aromatic 6-membered ring. The heterocyclic ring can also be mono- or polysubstituted, in particular by aliphatic radicals which are substituted or unsubstituted and/or interrupted by hetero groupings and/or arylene and/or by cycloaliphatic radicals which are substituted or unsubstituted and/or interrupted by hetero groupings, by hydroxyl, halogen, primary, secondary or tertiary amino groups. That which has already been stated for the aliphatic and cycloaliphatic radicals as $R^2$ to $R^5$ also applies to the aliphatic and cycloaliphatic radicals which are substituted or unsubstituted and/or interrupted and have been mentioned as substituents.

Suitable substituents are in particular straight-chain or branched ($C_1$-$C_{22}$)alkyl and/or ($C_1$-$C_{22}$)alkoxy.

Secondary and tertiary amino groups are in particular those carrying straight-chain or branched ($C_1$-$C_4$)alkyl radicals.

Preferred substituents for cycloaliphatic, heterocyclic and aryl radicals are straight-chain and branched ($C_1$-$C_{22}$)alkyl or ($C_1$-$C_{22}$)alkoxy radicals.

In a dye according to the invention of the formula I, different cations of the formula II and/or different radicals $R^1$ can also be present.

Preferred dyes according to the invention of the formula I have a —COO$^\ominus$ group content of 7 to 15% by weight.

particularly preferred dyes according to the invention of the formula I contain the dye chromophore of C.I. Leuco Sulphur Black 1 as F and/or have a —COO$^\ominus$ group content of 8 to 14% by weight.

The dyes according to the invention of the general formula I, which may contain uniform or mixed cations of the type mentioned, can be prepared by reacting a sulphur dye of the formula III in which $F^\ominus$ is the dye chromophore of C.I. Sulphur Black 1, 2, 5, 6, 7, 10, 11 or 12 in the leuco form with an α-halocarboxylic acid of the formula IV or the alkali metal salt thereof, as a result of which the reaction (1) takes place:

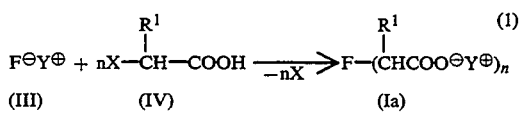

(III)　　(IV)　　(Ia)

and oxidizing the resulting dye of the formula Ia in the case where $F^\ominus$ or F is the dye chromophore of C.I. Leuco Sulphur Black 6, 7 or 11, and oxidizing it, if desired, in the case where $F^\ominus$ or F is the dye chromophore of C.I. Leuco Sulphur Black 1, 2, 5, 10 or 12, which converts F into the dye chromophore of C.I. Sulphur Black 1, 2, 5, 6, 7, 10, 11 or 12, and then reacting the resulting dye with a quaternary compound of the formula V, which, after reaction (2), results in formation of the dye I according to the invention:

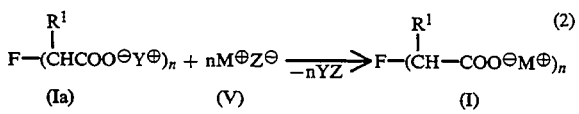

(Ia)　　(V)　　(I)

In the above reaction equations (1) and (2):

$Y^\oplus$ is an alkali metal cation, preferably $Na^\oplus$,

X is chlorine or bromine, $Z^\ominus$ is an acid anion, $M^\oplus$, $R^1$ and n have the meanings already mentioned.

Reaction (1) is usually carried out in aqueous medium at pH values of 7 to 14, preferably 9 to 11, and temperatures of 30 to 120° C., preferably 40° to 100° C.

It is also possible to use a mixture of different dyes of the formula III and/or a mixture of different α-halocarboxylic acids of the formula IV and/or the alkali metal salts thereof in reaction (1).

The leuco dyes of the formula III are known. In the synthesis of leuco sulphur dye C.I. Leuco Sulphur Black 1, C.I. No. 53185, 2,4-dinitrophenol or the sodium salt thereof (which can be prepared in situ by alkaline hydrolysis of 1-chloro-2,4-dinitrobenzene) is refluxed, for example, with sodium polysulphide in aqueous solution at 110° to 120° C. for 48 to 72 hours (see, for example, Colour Index, Third Edition, Volume 4 (1971), p. 4485, and the references cited there).

The leuco sulphur dyes

C.I. Leuco Sulphur Black 2, C.I. No. 53195,
C.I. Leuco Sulphur Black 5, C.I. No. 53205,
C.I. Leuco Sulphur Black 10, C.I. No. 53190 and
C.I. Leuco Sulphur Black 12, C.I. No. 53200 are prepared in the same manner as C.I. Leuco Sulphur Black 1. In this reaction, the following compounds are used instead of 2,4-dinitrophenol:

for C.I. Leuco Sulphur Black 2: a mixture of 2,4-dinitrophenol with picric acid or picramic acid;

for C.I. Leuco Sulphur Black 5: picric acid or picramic acid;

for C.I. Leuco Sulphur Black 10: a mixture of 2,4-dinitrophenol and p-aminophenol;

for C.I. Leuco Sulphur Black 12: a mixture of 2,4-dinitrophenol and 4-(2,4-dinitroanilino)-phenol, (see, for example, Colour Index, loc. cit. pp. 4485 and 4486, and the references cited there).

In the preparation of C.I. Leuco Sulphur Black 11, C.I. No. 53290, 4-(2-naphthylamino)-phenol is refluxed together with small amounts of phenol and 4,4'-iminodiphenol in a solution of sodium polysulphide in butanol at 108° C. for 30 hours (see, for example, Colour Index loc. cit., p. 4490, and the references cited there, in particular Bios Final Report No. 983, p. 59, 117-129). C.I. Leuco Sulphur Black 6, C.I. No. 53295, C.I. Leuco Sulphur Black 7, C.I. No. 53300 are prepared analogously, small amounts of p-nitrophenol and 2,4-diaminotoluene in the case of C.I. Leuco Sulphur Black 6 and small amounts of 4-(3-carbazolylamino)-phenol and p-nitrophenol in the case of C.I. Leuco Sulphur Black 7 being used in addition to 4-(2-naphthylamino)-phenol (see Colour Index loc. cit., p. 4491 and 4490, and the references cited there).

However, the leuco sulphur dyes of the formula III required as starting materials for preparing the sulphur dyes I according to the invention can also be prepared from the sulphur dyes C.I. Sulphur Black 1, C.I. No. 53185, C.I. Sulphur Black 2, C.I. No. 53195, C.I. Sulphur Black 5, C.I. No. 53205, C.I. Sulphur Black 6, C.I. No. 53295, C.I. Sulphur Black 7, C.I. No. 53300, C.I. Sulphur Black10, C.I. No. 53190, C.I. Sulphur Black 11, C.I. No. 52290, C.I. Sulphur Black 12, C.I. No. 53200 by a reaction known per se with reducing agents, such as, for example, $Na_2S$ and/or NaHS or sodium formaldehydesulphoxylate.

C.I. Leuco Sulphur Black 1 can also be obtained from C.I. Solubilized Sulphur Black 1, C.I. No. 53186, by reaction with reducing agents (see, for example, Rev. Pure Appl. Chem. 12, 72 (1962)).

The structure of the leuco sulphur dyes of the formula III is not yet known in detail. They are believed to be a mixture of different dyes. For C.I. Leuco Sulphur Black 1, structures VI and VII (K. Venkataraman "The Chemistry of Synthetic Dyes", Vol. II, p. 1090 (1952) and VIII (F. Gordon and P. Gregory "Organic Chemistry in Color", p. 16, Springer Verlag (1983)) have been proposed:

also be used in the form of their alkali metal salts, in particular their sodium salts.

Since the leuco sulphur dyes to be used of the formula III are often directly prepared from the organic starting materials, such as 2,4-dinitrophenol, it is convenient to base the amount of α-halocarboxylic acid of the formula IV or the alkali metal salt thereof to be used in reaction (1) on the starting material of the leuco sulphur dye, such as, for example, 2,4-dinitrochlorobenzene. Based on 1 mol of this organic starting material used for the synthesis of the leuco sulphur dye of the formula III (which can also be a mixture of different organic compounds) or based on 1 part by weight of the leuco sulphur dye of the formula III, the amount of α-halocarboxylic acid or the alkali metal salt thereof used can be varied within wide limits ranging, for example, from 0.4 to 2 mol of α-halocarboxylic acid or the alkali metal salt thereof, preferably 0.5 to 1.5 mol, and very particularly preferably 0.6 to 1.3 mol.

Reaction (1) is advantageously carried out in aqueous phase at an alkaline pH. Usually, the pH of the aqueous

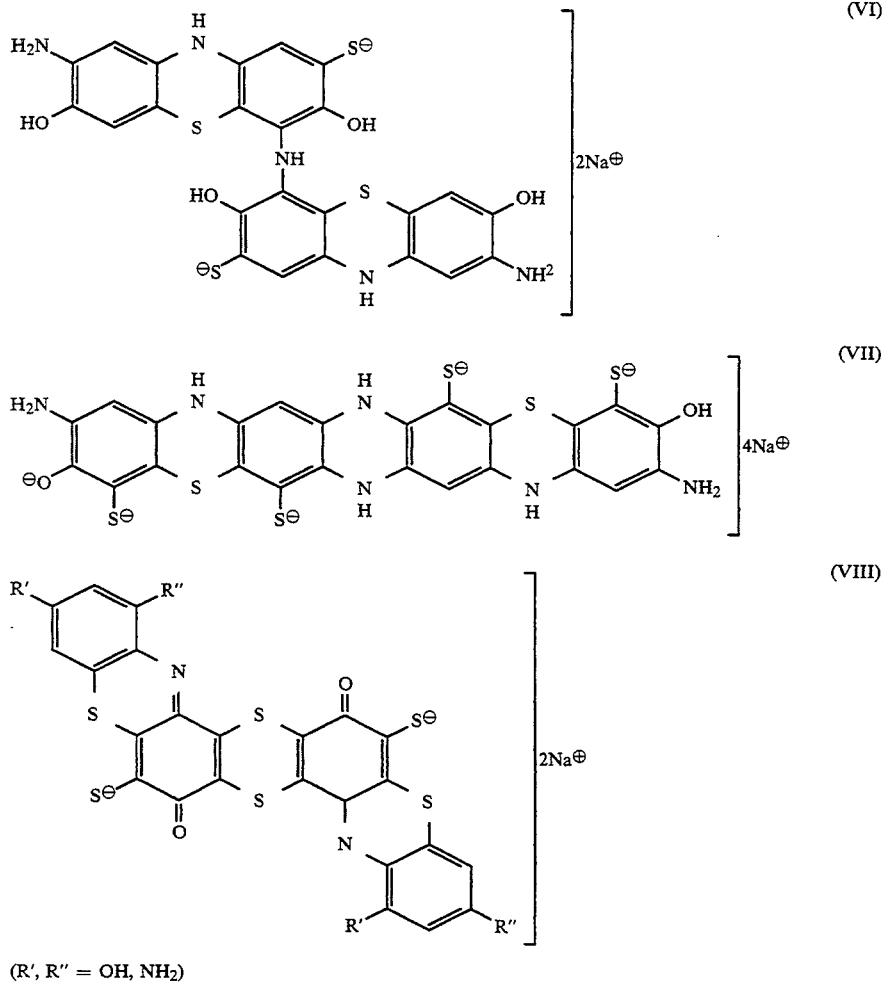

(R', R'' = OH, $NH_2$)

The reaction mixture formed in the synthesis of the leuco sulphur dyes can be used, if appropriate after dilution with water, directly for the synthesis of the dyes Ia according to (1).

Preferably used α-halocarboxylic acids of the formula IV are: α-chloro- or α-bromoacetic acid, α-chloro- or α-bromopropionic acid and α-chloro- or α-bromobutyric acid. The α-halocarboxylic acids can phase is already alkaline from the preparation of the leuco sulphur dye.

In the case where F in formula Ia is the dye chromophore of C.I. Leuco Sulphur Black 1, 2, 5, 10 or 12, the aqueous solutions obtained in reaction (1) are black solutions and can be reacted directly with a quaternary compound V or a mixture of such quaternary compounds in accordance with reaction (2).

In the case where F in formula Ia is the dye chromophore of C.I. Leuco Sulphur Black 6, 7 or 11, reaction (1) gives greenish or dark-green solutions of the compounds Ia in which the dye chromophore F present in the leuco form has to be converted by oxidation in a manner known per se into the black dye chromophore of C.I. Sulphur Black 6, 7 or 11. Examples of oxidizing agents suitable for this oxidation are all those which are known from the preparation of sulphur dyes or dyeing with sulphur dyes to convert a sulphur dye from the leuco form into the actual dye form, such as, for example, bromine, iodine, sodium chlorite, sodium bromate in weakly acidic solution catalyzed by vanadate, but preferably hydrogen peroxide in acidic or, preferably, alkaline aqueous phase. Such a conversion of the chromophore of the leuco form into the actual dye form is not necessary in the case where F in compounds Ia is the dye chromophore of C.I. Leuco Sulphur Black 1, 2, 5, 10 or 12 but can be carried out, if desired. The preferred oxidation with hydrogen peroxide in aqueous phase is advantageously carried out at standard temperature or only slightly elevated temperature.

The reactions in accordance with reaction equation (2) are usually carried out in an aqueous reaction medium at pH values of 4 to 8, preferably 5 to 7, and temperatures of 0° to 100° C., preferably 10° to 50° C. The water-insoluble dyes according to the invention of the formula formed in this reaction as an aqueous suspension can be separated off and isolated in a known manner, for example, by filtration, washing and drying.

In formula V, $Z^\ominus$ can be the anion of a weak or strong inorganic or organic acid and be derived, for example, from hydrochloric acid, sulphuric acid, phosphoric acid, acetic acid, hydrobromic acid, sulphurous acid, p-toluenesulphonic acid.

Alternatively, it is also possible to precipitate the sparingly soluble dye acids of the formula Ib

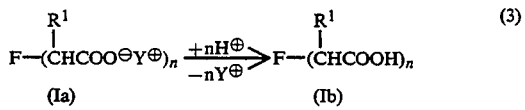

(3)

from the initially obtained aqueous solutions of the alkali metal salts of the dyes of the formula Ia in which F is the dye chromophore of C.I. Leuco Sulphur Black 1, 2, 5, 10 or 12 or of C.I. Sulphur Black 1, 2, 5, 6, 7, 10, 11 or 12 by adjusting the pH to an acid value, in particular to a pH of 0 to 5, preferably 2 to 4, and to separate off and isolate the dye acids of the formula Ib in a manner known per se, for example by filtration, and to convert them into the dyes according to the invention of the formula Ic by neutralization with an amine of the formula IX

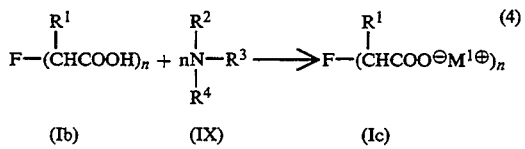

(4)

in which $M^{1\oplus}$ has the meaning of $M^\oplus$ where X is N and $R^5$ is H.

The pH adjustment in reaction (3) can be effected by means of a suitable acid, for example by means of a strong acid, in particular of a mineral acid, such as hydrochloric acid, sulphuric acid or phosphoric acid.

Since the dye acids of the formula Ib are sparingly soluble, the salts present in the solution of the dyes of the formula I as a result of the preparation, such as chlorides, sulphates, sulphites or thiosulphates, in particular sodium chloride, sodium sulphate, sodium sulphite or sodium thiosulphate, can be easily removed.

The neutralization in accordance with reaction equation (4) can be carried out in water or, preferably, in an organic solvent or solvent mixture in which the dyes of the formula I are soluble at standard temperature, reduced or elevated temperature. The dyes of the formula I are then, if desired, isolated in a suitable manner known per se.

Examples of suitable amines of the formula IX or suitable amines from which the quaternary compounds of the formula V are derived by quaternization with a quaternizing agent or by salt formation with an inorganic or organic acid are: n-hexylamine, heptylamine, isoheptylamine, n-octylamine, isooctylamine, tert.-octylamine, 2-ethylhexylamine, 2,4,4-trimethyl-2-pentylamine, 1,5-dimethylhexylamine, 1-methylheptylamine, nonylamine, isononylamine, 3,5,5-trimethylhexylamine, decylamine, dodecylamine, hexadecylamine, stearylamine, coconut fatty amine, oleylamine, 6-ethyl-4-oxadecylamine, 11-methyl-4-oxadecylamine, di-n-butylamine, di-2-ethylhexylamine, di-isononylamine, distearylamine, dicyclohexylamine, di-isopropylethylamine, tri-n-butylamine, tri-isooctylamine, dimethyl coconut fatty amine, dimethyldodecylamine, tribenzylamine, dodecylaminobisethanol, bis(hydroxyethyl) coconut fatty amine, bis(hydroxyethoxyethyl) coconut fatty amine, tris(3,6-dioxaheptyl)amine, pyrrolidine, piperidine, 3- or 4-alkylpiperidines, such as, for example, 4-methylpiperidine, 4-hexylpiperidine, alkylpiperazines and alkylmorpholines having at least 2 C atoms in the alkyl radical, such as, for example, N-ethylmorpholine, N-butylmorpholine, 1-ethylpiperazine, 1-octylpiperazine, cyclohexylamine, dicyclohexylamine, aniline, anilines substituted on the ring by ($C_1$-$C_{22}$)-alkyl and/or ($C_1$-$C_{22}$)alkoxy, such as, for example, o-, m- and p-toluidine, o-, m- and p-anisidine, o-, m- and p-phenetidine, 1- and 2-naphthylamine, 1,3-cyclopentanediamine, 2,3-, 2,4-, 2,5-, 2,6-xylidine, 4-hexylaniline, 4-octylaniline, 4-decylaniline, 4-butoxyaniline, N-methylaniline, N-hexyl-4-pentylaniline, benzylamine, styrylamine, diphenylamine, dibenzylamine, phenethylamine, 4-methylpyridine, 4-octylpyridine, 4-vinylpyridine, 4-allylpyridine, quinoline, lepidine, quinaldine, perhydroazepine, perhydroazecine.

Examples of quaternary ammonium salts and phosphonium salts of the formula V which in accordance with reaction equation (2) are suitable for preparing the water-insoluble sulphur dyes I according to the invention are: tetrapropylammonium bromide, tetrabutylammonium bromide, benzyltributylammonium chloride, benzyltriethylammonium chloride, benzyldimethylhexadecylammonium chloride, 3-benzyl-5-(2-hydroxyethyl)-4-methylthiazolium chloride, hexadecylpyridinium chloride, methyltrioctylammonium chloride, methyltridecylammonium chloride, dimethyldioctylammonium chloride, dimethyldidecylammonium chloride and dimethyldidecylammonium bromide, dimethyldihexadecylammonium chloride, trimethyldodecylammonium chloride, trimethylhexadecylammonium chloride, trimethyloctadecylammonium chloride, tetrabutylphosphonium acetate, tributylhexadecylphosphonium bromide, benzyldodecylbis(hydroxyethyl)ammonium chloride, tetraoctylammonium chloride, dimethyldidodecylammonium chloride, dimethylditetradecylammonium chloride, dimethyldioctadecylammonium chloride, dimethyldioleylammonium chloride, dimethyldi(coconut fatty alkyl)ammonium chloride, dimethylbenzyl(coconut fatty alkyl)ammonium chloride, methyltridodecylammonium chloride, trimethyldecylammonium chloride, trimethyldodecylammonium chloride, trimethyltetradecylammonium chloride, trimethyl-9-octadecenylammonium chloride, trimethyl(tallow fatty alkyl)ammonium chloride, trimethyl(soya oil alkyl)ammonium chloride, trimethyl(coconut fatty alkyl)ammonium chloride, dimethylbenzyltetradecylammonium chloride, dimethylbenzyloctadecylammonium chloride, dimethylbenzyltetradecylammonium bromide, dimethyldodecylbenzylammonium chloride, benzyldioctyldodecylammonium chloride, 4-pentadecyl-N-methylpyridinium bromide, 4-heptadecyl-N-ethylpyridinium bromide, 4-tridecyl-N-propylpyridinium bromide, 4-tridecyl-N-allylpyridinium chloride, 4-(1-hexyldecyl)-N-butylpyridinium bromide, 4-(2-methyloctyl)-N-hexylpyridinium bromide, 4-ethyl-N-octylpyridinium bromide, 4-hexyl-N-octylpyridinium bromide, 4-methyl-N-hexadecylpyridinium chloride, N-octylpyridinium bromide, N-(2-ethylhexyl)pyridinium bromide, N-dodecylpyridinium chloride, N-hexadecylpyridinium bromide, N-hexadecylpyridinium hydrogen sulphate, N-octadecylpyridinium p-toluenesulphonate, 2-tridecyl-N-butylpyridinium bromide, 2-heptyl-N-(2-methyloctyl)pyridinium bromide, 2-pentyl-N-decylpyridinium bromide, 2-methyl-N-dodecylpyridinium bromide, 2,6-dimethyl-N-dodecylpyridinium bromide, 2-methyl-5-ethyl-N-hexadecylpyridinium bromide, tributyltetradecylphosphonium chloride, dimethylbenzyldodecylphosphonium chloride, trimethyltetradecylphosphonium chloride, trimethylhexadecylphosphonium chloride, dimethylbenzyloctadecylphosphonium chloride, tributyl(coconut alkyl)phosphonium chloride.

The compounds of the formulae V and IX are known, most of them are commercially available or can be synthesized by the preparation processes known for these classes of compounds.

It may be advantageous to carry out the required oxidation of the dye chromophores C.I. Leuco Sulphur Black 6, 7 and 11 to the dye chromophores C.I. Sulphur Black 6, 7 and 11 or the oxidation of the dye chromophores C.I. Leuco Sulphur Black 1, 2, 5, 10 or 12 to the dye chromophores C.I. Sulphur Black 1, 2, 5, 10 or 12 to be carried out, if desired, not directly following the reaction (1) but, prior to the oxidation, first to precipitate and isolate the dye acids Ib. The dye acids Ib are then again brought into solution, for example by introducing them into water or by bringing the pH to an alkaline value, for example by addition of an alkali metal hydroxide, preferably sodium hydroxide. The oxidation which then takes place is carried out as already mentioned. This is followed by reaction (2) or by reactions (3) and (4) to obtain the dyes according to the invention.

If the leuco sulphur dyes of the formula III required as starting material are prepared by reduction of the corresponding sulphur dyes, reaction (1) can also be carried out simultaneously with the reduction.

The water-insoluble black dyes according to the invention of the formula I are suitable, for example, as colorants for solvent-containing inks, writing inks and recording fluids, in particular for the ink-jet printing method, and for the hot-melt printing method, as infrared absorbers, and as colorants and charge-control agents for electrophotographic toners.

The solubility of the water-insoluble sulphur dyes according to the invention of the formula I in organic solvents depends on the chain length and the degree of branching of the substituents $R^2$ to $R^5$.

Dyes of the formula I which are soluble in alcohols or methyl ethyl ketone are obtained if the sum of the carbon atoms of the aliphatic, cycloaliphatic and/or arylalkyl radicals present in radicals $R^2$ to $R^5$ is 6 to 14 and any aliphatic radicals present are, in particular, branched. Such sulphur dyes I according to the invention which are soluble in organic solvents exhibit excellent light fastness and water fastness and are highly suitable for producing inks for industrial ink-jet printing methods, for example for coding, marking and addressing.

The ink-jet printing method and the requirements of the inks and recording fluids used in this method are described, for example, in: Kirk-Othmer, Encyclopedia of Chemical Technology, 3rd Ed., Vol. 20 (1982), 153–156, and in Ullmann's Encyclopedia of Industrial Chemistry, 5th Ed., Vol. A 13 (1989), 588–594. In Ullmann's loc. cit. 595 and Gregory: High Technology Application of Organic Colorants, Plenum Press (1991),. 182, also describe the requirements of hot-melt inks.

The inks and recording fluids for the ink-jet method preparable by means of the black dyes according to the invention of the formula I have excellent storage stability even in concentrated form and excellent printing properties, in particular good response and ejection behaviour, good droplet formation and excellent image properties, in particular with respect to density, hue, contrast, water fastness, light fastness and weather fastness.

An ink for the ink-jet printing method consists of a solution of one or more dyes of the general formula I in a suitable organic solvent or solvent mixture, in particular in ethanol and/or methyl ethyl ketone. Examples of other solvents are methanol, propanol, isopropanol, butanol, sec.-butanol; amides, such as, for example, dimethylformamide, and dimethylacetamide; ketones or ketone alcohols, such as, for example, acetone or diacetone alcohol; furthermore glycols and glycol ethers, such as, for example, ethylene glycol, diethylene glycol, triethylene glycol, diethylene glycol monoethyl ether.

Fatty acids and/or fatty acid esters and/or sulphonamides can also be present as nonvolatile vehicles. The ink can also contain one or more other dyes and/or one or more auxiliaries, such as, for example, biocides, conducting salts or agents for adjusting the electric resistance, such as, for example, lithium chloride, sodium chloride, sodium sulphate, ammonium chloride, corrosion inhibitors, thickeners or agents for influencing the viscosity, and the like, The amount of the dyes according to the invention of the formula I in the ink or recording fluid depends on the desired optical density of the image. As a rule, the ink contains 0.5 to 20% by weight, preferably 0.5 to 15% by weight, of one or more sulphur dyes of the formula I. The ink or recording fluid contains, for example, 99.5 to 80, preferably 99.5 to 85,% by weight of one or more organic solvents.

The inks or recording fluids can be produced by dissolving a dye according to the invention of the formula I, in particular a dye according to the invention prepared from C.I. Leuco Sulphur Black 1 and preferably having a —COO$^\ominus$ group content of 7 to 15% by weight, in an organic solvent, preferably in ethanol and/or methyl ethyl ketone, or in a mixture of organic solvents, and then, if desired, adding the other components, auxiliaries and the like, followed by filtration.

When producing an ink or recording fluid, the neutralization according to reaction equation (4) can advantageously also be carried out in the solvent or solvent mixture of the ink or recording fluid. Further auxiliaries or components of the ink or the recording fluid can then, if desired, be added to the resulting solution of the dye I.

EXAMPLE 1

500 ml of water are added to 769.4 g of a 25% strength solution of C.I. Leuco Sulphur Black 1 prepared in a manner known per se from 202.6 g of 2,4-dinitrochlorobenzene (see, for example, Fierz-David, Blangey: Grundlegende Operationen der Farbenchemie, 8th Edition (1952), 329–330), and a solution of 145.6 g of sodium monochloroacetate in 700 ml of water is added at 60° C. Stirring at 60° C. is continued for 2 hours, and 32% strength aqueous hydrochloric acid is added until a pH of 7.0 is reached in order to precipitate the dye acid. 670 ml of a 2-molar solution of 2-ethylhexylammonium chloride is then added to the black dye solution. The dye suspension obtained is then stirred at 30° C. for 1 hour, filtered, and the filter cake is washed with 2500 ml of water until free of electrolyte, and dried at 100° C.

Yield: 306.5 g of a black powder Absorption spectrum in ethanol: $\lambda_{max}$: 620 nm COO$^\ominus$ content: 10.5% by weight The dye is highly suitable for producing inks for the ink-jet method to give black prints having excellent light fastness and water fastness.

EXAMPLE 2

The procedure described in Example 1 is carried out with a solution of 174.8 g of sodium monochloroacetate in 800 ml of water (instead of 145.6 g of sodium monochloroacetate in 700 ml of water).

Yield: 315.6 g of a black powder Absorption spectrum in ethanol: $\lambda_{max}$: 615 nm COO$^\ominus$ content: 13.7% by weight

EXAMPLE 3

The procedure described in Example 1 is repeated, using a solution of 163.1 g of sodium α-chloropropionate in 800 ml of water instead of a solution of 145.6 g of sodium monochloroacetate in 700 ml of water.

This gives 333.1 g of a black powder. Absorption spectrum in ethanol: $\lambda_{max}$: 618 nm COO$^\ominus$ content: 9.9% by weight

EXAMPLE 4

Condensation of 769.4 g of a 25% strength aqueous solution of C.I. Leuco Sulphur Black 1 with a solution of 145.6 g of sodium monochloroacetate is carried out by the procedure of Example 1. In order to precipitate the dye acid, 159.0 g of 32% strength hydrochloric acid are then added until a pH of 2 is reached. The precipitated dye acid is isolated by filtration, washed with 3 l of water until free of salt and dried at 100° C. to constant weight.

Yield: 217.0 g of a black powder COO$^\ominus$ content: 10.5% by weight 100.0 g of the black powder obtained are introduced into 1500 g of 95% pure ethanol, and 68.0 g of 2-ethylhexylamine are added and dissolved at 75° C. by stirring. This gives 1668 g of a black, stable ink which is highly suitable for the ink-jet printing method. The black prints obtained have excellent light fastness and water fastness.

Further black dyes according to the invention of the general formula I which can be prepared by the procedure of Example 1 are shown in the table below, in which in column 2 the quaternary salts of the formula V used for precipitating the water-insoluble black sulphur dyes in accordance with reaction equation 2 are listed.

| Example | Quaternary salt of formula V |
|---|---|
| 5 | $CH_3-\underset{\underset{}{\mid}}{CH}-C_6H_{12}-\overset{\oplus}{N}H_3Cl^\ominus$ with $CH_3$ on top |
| 6 | $CH_3-\underset{\underset{}{\mid}}{CH}-C_6H_{12}-O-(CH_2)_3-\overset{\oplus}{N}H_3Cl^\ominus$ with $CH_3$ on top |
| 7 | $C_4H_5-\underset{\underset{C_2H_5}{\mid}}{CH}-CH_2CH_2-O-(CH_2)_3-\overset{\oplus}{N}H_3Cl^\ominus$ |
| 8 | $CH_3-\underset{\underset{CH_3}{\mid}}{\overset{\overset{CH_3}{\mid}}{C}}-CH_2-\underset{\underset{CH_3}{\mid}}{\overset{\overset{CH_3}{\mid}}{C}}-\overset{\oplus}{N}H_3Cl^\ominus$ |
| 9 | $CH_3-\underset{\underset{CH_3}{\mid}}{\overset{\overset{CH_3}{\mid}}{C}}-CH_2-\overset{\overset{CH_3}{\mid}}{CH}-CH_2CH_2-\overset{\oplus}{N}H_3Cl^\ominus$ |
| 10 | $CH_3-\overset{\overset{CH_3}{\mid}}{CH}-(CH_2)_3-\overset{\overset{CH_3}{\mid}}{CH}-\overset{\oplus}{N}H_3Cl^\ominus$ |
| 11 | $C_{12}H_{25}-\overset{\oplus}{N}H_3Cl^\ominus$ |
| 12 | $C_{12}H_{25}-\underset{H}{\overset{\oplus}{N}}-(CH_3)_2Cl^\ominus$ |
| 13 | $C_8H_{17}-\underset{H}{\overset{\oplus}{N}}-(CH_2CH_2OH)_2Cl^\ominus$ |
| 14 | $C_{10}H_{21}\underset{H}{\overset{\oplus}{N}}-(CH_2CH_2OH)_2Cl^\ominus$ |
| 15 | $C_{12}H_{25}-\underset{H}{\overset{\oplus}{N}}-(CH_2CH_2OH)_2Cl^\ominus$ |
| 16 | $C_{14}H_{29}-\underset{H}{\overset{\oplus}{N}}-(CH_2CH_2OH)_2Cl^\ominus$ |
| 17 | $C_{18}H_{37}-\underset{H}{\overset{\oplus}{N}}-(CH_2CH_2OH)_2Cl^\ominus$ |
| 18 | $\left[\text{C}_6\text{H}_{11}\right]_2\overset{\oplus}{N}H_2Cl^\ominus$ (dicyclohexyl) |

-continued

| Example | Quaternary salt of formula V |
|---|---|
| 19 | $\overset{\oplus}{N}-(C_4H_9)_4 Cl^{\ominus}$ |
| 20 | $H\overset{\oplus}{N}-(C_4H_9)_3 Cl^{\ominus}$ |
| 21 | $\overset{\oplus}{P}-(C_4H_9)_4 Cl^{\ominus}$ |
| 22 | 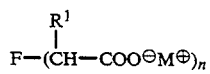 |
| 23 | 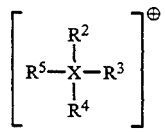 |
| 24 | $(C_{10}H_{21})_2-\overset{\oplus}{N}-(CH_3)_2 Cl^{\ominus}$ |
| 25 | $(C_{10}H_{21})_3\overset{\oplus}{N}-CH_3 Cl^{\ominus}$ |
| 26 | $C_{16}H_{33}-\overset{\oplus}{N}-(CH_3)_3 Cl^{\ominus}$ |

EXAMPLE 27

Condensation of 769.4 g of a 25% strength solution of C.I. Leuco Sulphur Black 1 prepared from 202.6 g of 2,4-dinitrochlorobenzene with 145.6 g of sodium monochloroacetate is carried out by the procedure of Example 1. The dye acid is then precipitated at a pH of 2 by addition of 159.0 g of 32% strength hydrochloric acid. The dye acid is isolated by filtration and washed with 3 l of water until free salt.

The dye acid obtained is then dissolved in 1750 ml of water by addition of 68ml of 10N sodium hydroxide solution, 43.0 g of 35% strength hydrogen peroxide are added, and the mixture is stirred at 25° to 30° C. for 6 hours. 670 ml of a 2-molar aqueous 2-ethylhexylammonium chloride solution is then added to the black dye solution, the dye suspension is stirred at 30° C. for 1 hour, filtered, and the filter cake is washed with 2.5 l of water until free of electrolyte. The dye is dried at 80° C. in vacuo to constant weight.

Yield: 312.1 g of a black powder Absorption spectrum in ethanol: $\lambda_{max}$: 590 nm $COO^{\ominus}$ content: 10.6% by weight

EXAMPLE 28

104 g of C.I. Sulphur Black 11 (for preparation, see Colour Index, Vol. 4, 3th Edition (1971); Bios Final Report 983, p. 59, 117–129) are suspended in 1 l of water and 144 ml of 10N sodium hydroxide solution and 62.4 g of 60% strength sodium sulphide are added. The reaction mixture is then stirred at 95° to 100° C. for 2 hours. This is followed by adding a solution of 120.8 g of sodium monochloroacetate in 250 ml of water and stirring the resulting mixture at 60° C. for 2 hours. Precipitation of the dye acid is effected by addition of 212 g of 30% strength hydrochloric acid until a pH of 3 is reached.

The precipitated dye acid is filtered off and washed with 2 l of water until free of salt. The press cake obtained is introduced into 800 ml of water, and the resulting mixture is brought to a pH of 7.5 with 16 ml of 10N sodium hydroxide solution. 20 g of 35% strength hydrogen peroxide are then added to the dark-green solution, the mixture is stirred at 30° C. for 2 hours, and 220 ml of a 2-molar aqueous 2-ethylhexylammonium chloride solution are added.

The precipitated product is filtered off, washed with 1 l of water until free of electrolyte and dried at 80° C. in vacuo to constant weight.

Yield: 116.8 g of a black powder Absorption spectrum in ethanol: $\lambda_{max}$: 570 nm $COO^{\ominus}$ content: 7.4% by weight

We claim:

1. Black water-insoluble sulphur dyes of the formula I $$F-(\overset{R^1}{\underset{|}{CH}}-COO^{\ominus}M^{\oplus})_n \quad (I)$$

in which F is the dye chromophore of C.I. Sulphur or Leuco Sulphur Black 1, C.I. No. 53185; C.I. Sulphur or Leuco Sulphur Black 2, C.I. No. 53195; C.I. Sulphur or Leuco Sulphur Black 5, C.I. No. 53205; C.I. Sulphur Black 6, C.I. No. 53295; C.I. Sulphur Black 7, C.I. No. 53300; C.I. Sulphur or Leuco Black 10, C.I. No. 53190; C.I. Sulphur Black 11, C.I. No. 53290, or C.I. Sulphur or Leuco Sulphur Black 12, C.I. No. 53200, $R^1$ is hydrogen or alkyl, $M^{\oplus}$ is a cation of the formula II $$\left[\begin{array}{c} R^2 \\ | \\ R^5-X-R^3 \\ | \\ R^4 \end{array}\right]^{\oplus} \quad (II)$$

X is nitrogen or phosphorus, $R^2$, $R^3$, $R^4$, $R^5$, independently of one another, are hydrogen, an aliphatic radical which is substituted or unsubstituted and/or interrupted by hereto groupings and/or arylene, a cycloaliphatic radical which is substituted or unsubstituted and/or interrupted by hetero groupings, a substituted or unsubstituted aryl radical or $-(CH_2CH_2O)_m R^6$, or 2 or 3 of the radicals $R^2$, $R^3$, $R^4$, $R^5$ together with the quaternary atom X to which they are attached form a heterocyclic ring which may also contain other hetero groupings and/or be substituted, and $R^6$ is hydrogen, alkyl, m is a number from 1 to 5, n is such a large number that the dye I contains 5 to 20% by weight of $-COO^{\ominus}$ groups, the sum of carbon atoms of the hydrophobic radicals present in $R^2$, $R^3$, $R^4$ and $R^5$ in cation II being at least 6.

2. Sulphur dyes according to claim 1, wherein $R^1$ is hydrogen, methyl or ethyl and/or $R^2$, $R^3$, $R^4$, $R^5$, independently of one another, are hydrogen, an aliphatic radical having 1 to 30 C atoms which is unsubstituted or mono- or polysubstituted by hydroxyl, ($C_1$-$C_4$) alkoxy, primary, secondary or tertiary amino groups, substituted or unsubstituted aryl and/or interrupted once or more than once by $-O-$, $-S-$, $-NH-$, $-N((C_1$-$C_4)$-alkyl)$-$, ester groupings, amide groupings, bivalent heterocyclic radicals and/or arylene; a cycloaliphatic radical having 5 to 12 C atoms which is unsubstituted or mono- or polysubtituted by hydroxyl, ($C_1$-$C_2$-$_2$)alkyl, ($C_1$-$C_{22}$) alkoxy, substituted or unsubstituted aryl, primary, secondary or tertiary amino groups, and/or interrupted once or more than once by —O—, —S—, —NH—, —N((C$_1$-C$_4$)-alkyl)—, ester or amide groupings; an aliphatic radical having 1 to 30 C atoms which is unsubstituted or mono- or polysubstituted by hydroxyl, halogen, trifluoromethyl, primary, secondary or tertiary amino groups and/or substituted or unsubstituted aryl and/or interrupted by hereto groupings and/or arylene and/or an aryl radical which is unsubstituted or substituted by a cycloaliphatic radical having 5 to 12 C atoms which is substituted or unsubstituted and/or interrupted by hereto groupings or 2 or 3 of the radicals R$^2$, R$^3$, R$^4$, R$^5$ together with the quaternary atom X to which they are attached form a 5- or 6-membered heterocyclic ring which additionally can also contain —O—, —N=, —NH— and/or —N((C$_1$-C$_4$)alkyl)— and/or possess a fused-on ring and/or an aliphatic radical having 1 to 30 C atoms which is mono- or polysubstituted by hydroxyl, (C$_1$-C$_4$)alkoxy, primary, secondary or tertiary amino groups, substituted or unsubstituted aryl and/or interrupted once or more than once by —O—, —S—, —NH—, —N((C$_1$-C$_4$)alkyl)—, ester groupings, amide groupings, bivalent heterocyclic radicals and/or aryl; a cycloaliphatic radical having 5 to 12 C atoms which is mono- or polysubstituted by hydroxyl, (C$_1$-C$_{22}$)alkyl, (C$_1$-C$_{22}$)alkoxy, substituted or unsubstituted aryl, primary, secondary or tertiary amino groups, and/or interrupted once or more than once by —O—, —S—, —NH—, —NH((C$_1$-C$_4$)alkyl)—, ester or amide groupings, and/or R$^6$ is hydrogen or (C$_1$-C$_4$)alkyl.

3. Sulphur dyes according to claim 1, wherein F is the dye chromophore of C.I. Leuco Sulphur Black 1, C.I. No. 53185, and/or in that 7 to 15% of carboxyl groups are present in the dye molecule.

4. Sulphur dyes according to claim 1, wherein the sum of carbon atoms of the aliphatic, cycloaliphatic and/or aryl radicals present in the radicals R$^2$ to R$^5$ is 6 to 14.

5. Process for preparing the sulphur dyes of claim 1 comprising reacting a sulphur dye of the formula III

in which
F$^\ominus$ is the dye chromophor of C.I. Leuco Sulphur Black 1, 2, 5, 6, 7, 10, 11 or 12 and
Y$^\oplus$ is an alkali metal cation, with an α-halo-carboxylic acid of the formula IV

in which
X is chlorine or bromine and
R$^1$ is hydrogen, methyl or ethyl, or an alkali metal salt thereof, and in that the resulting compound of formula Ia

is oxidized in the case where F$^\ominus$ and F are the dye chromophore of C.I. Leuco Sulphur Black 6, 7 or 11, and is oxidized; optionally in the case where F$^\ominus$ and F are the dye chromophore of C.I. Leuco sulphur Black 1, 2, 5, 10 or 12, and either:
a) the resulting compound is reacted with a quaternary compound of the formula V

in which
M$^\oplus$ has the meaning given in claim 1 and
Z$^\ominus$ is an acid anion, or
b) the dye acid of the formula Ib

is precipitated from the solution of the compound of the formula Ia by adjusting the pH to an acid value and neutralized with an amine of the formula IX

in which
R$^2$, R$^3$ and R$^4$ have the meaning given in claim 1.

6. The process according to claim 5, further comprising after preparing the compound Ia, the oxidation to be performed in the case where F$^\ominus$ or F is the dye chromophore of C.I. Leuco sulphur Black 6, 7 or 11 and optionally in the other cases oxidation is carried out such that the dye acid of the formula Ib is precipitated from the solution of the compound Ia by adjusting the pH to an acid value, separated off and redissolved compound of the formula V, or the dye acid of the formula Ib is precipitated and then neutralized with an amine of the formula IX.

7. Recording fluid comprising the dye of claim 1 in an organic solution.

8. Recording fluid according to claim 7, wherein said fluid contains about 0.5 to about 20% by weight of a dye of the formula I.

9. Recording fluid according to claim 7, wherein said fluid contains about 99.5 to about 80%, by weight of an organic solvent or solvent mixture.

10. A recording fluid as claimed in claim 8, wherein said fluid contains about 0.5 to about 15% by weight of a dye of formula I.

11. Recording fluid according to claim 9, wherein said fluid contains about 99.5 to about 5% by weight of an organic solvent or solvent mixture.

12. Sulphur dyes according to claim 1, wherein R$^1$ and R$^6$ are identical or different and are methyl or ethyl.

13. Sulphur dyes according to claim 11, wherein R$^2$ to R$^5$ are identical or different and are alkyl radicals having 1 to 22 carbons or alkenyl radicals having 2 to 22 carbons.

14. Recording fluids as claimed in claim 7, wherein said recording fluid is an ink-jet printing ink.

* * * * *

UNITED STATES PATENT AND TRADEMARK OFFICE
CERTIFICATE OF CORRECTION

PATENT NO. : 5,374,302
DATED : December 20, 1994
INVENTOR(S) : Bauer et al

It is certified that error appears in the above-indentified patent and that said Letters Patent is hereby corrected as shown below:

In the specification at column 2, line 66, "hereto" should read: --hetero--.

In the specification at column 3, line 1, "hereto" should read: --hetero--.

In the specification at column 3, line 11, "hereto" should read: --hetero--.

In claim 2, column 15, line 8, "hereto" should read: --hetero--.

In claim 2, column 15, line 12, "hereto" should read: --hetero--.

Signed and Sealed this

Twenty-third Day of May, 1995

Attest:

BRUCE LEHMAN

*Attesting Officer*      *Commissioner of Patents and Trademarks*